INVENTOR
GEORGE G. LAMPKE
BY Herbert W. Arnold
ATTORNEY

INVENTOR
GEORGE G. LAMPKE
BY Herbert W. Arnold
ATTORNEY

March 30, 1965 G. G. LAMPKE 3,176,224

COMPRESSOR-EXPANDER

Filed Nov. 25, 1960 3 Sheets-Sheet 3

INVENTOR
GEORGE G. LAMPKE
BY Herbert W. Arnold
ATTORNEY

United States Patent Office 3,176,224

Patented Mar. 30, 1965

3,176,224
COMPRESSOR-EXPANDER

George G. Lampke, Framingham, Mass., assignor to Raytheon Company, Lexington, Mass., a corporation of Delaware Filed Nov. 25, 1960, Ser. No. 71,609
10 Claims. (Cl. 325—38)

This invention relates to pulse signal transmission systems, and particularly to volume range compression and expansion arrangements for reducing the effects of noise in such systems.

Pulse code modulation systems utilizing pulse amplitude modulation (PAM) of the signal energy employing a compressor and expander (compandor) arrangement in order to provide a better signal-to-noise ratio are known. Compandor arrangements have long been utilized in connection with ordinary signal transmission, and more recently in PCM systems wherein the modulator unit operates into a circuit having a compression characteristic for the compression of the volume range of audio or speech energy signal variation at the transmitter so as not to exceed the total transmitter energy range, and the demodulator system operates into a circuit having an expansion characteristic complementary to the compression characteristic for providing an overall linearity in the PCM system.

In the prior art ordinary signal transmission systems, it has proved advantageous and desirable to transmit faithfully signals having an extremely wide range of volumes, such as music, by means of a transmission medium which itself possesses a limited volume range. The range of signal volumes which can be satisfactorily transmitted is limited by the characteristics of the transmission medium used and those of the transmission apparatus which may be employed therewith. Such limitation by the transmission medium or apparatus in connection with ordinary signal transmission, is equally or even more of a limiting condition in PCM systems. In order to prevent signal distortion, it is necessary that the minimum transmitted signal amplitudes be maintained above that of the noise or other interference introduced by the transmission medium or apparatus, and that the maximum transmitted signal volumes be maintained below that value which would cause transmission apparatus, such as repeaters, in the system, to overload.

Various compandors have been proposed for accomplishing this undistorted transmission for ordinary signals, and certain of such devices have been extended or employed in PCM systems with varying degrees of effectiveness. In general theory, compandor arrangements function at the transmitting end of the system to relatively over-amplify the smaller amplitudes of the signals until they are large with respect to the undesired noise amplitudes and to under-amplify the larger amplitudes of the signals so that they do not overload the transmission medium or the apparatus therein, thus effectively compressing the volume range of the signals to bring them within the volume transmission range of the transmission medium before transmitting them thereover. By employing similar apparatus operating in a reverse complementary manner at the receiving or demodulating end of the system, the volume range of the received signals is effectively expanded to restore their original amplitude relations. A compandor arrangement thus provides a better signal-to-noise ratio to the overall system. As applied to PCM systems utilizing PAM transmission the expansion of a low volume range or amplitude level transmitted signal is particularly advantageous in that when such signal is later compressed a better overall signal-to-noise ratio is obtained since the noise level is also compressed.

Prior art compandors for PAM signals, following the principles developed with the earlier ordinary signal transmission systems, have utilized the non-linear characteristics of diodes to perform or produce the required compression and expansion of the signals. However, the use of diodes either of the vacuum type, or more particularly of the semiconductor type, may result in undesirable overall signal degradation due to non-uniformity of the temperature stability properties and/or the characteristic curves of the diodes used at each end of the transmission circuit.

Accordingly, the principal object of the present invention is to reduce the signal distortion in PAM systems employing a compandor arrangement by eliminating the use of diodes.

A further object of the present invention is to afford better temperature stability and the elimination of the matching requirements of diode characteristic curves in complementary volume range compressing and expanding circuits.

The above objects are accomplished in accordance with the present invention by utilizing in place of the diode circuits of the prior art, ramp or slope functions which are generated or derived from, and in timed sequence with, the cyclic pulse repetition rate of the PCM system. The compression and expansion transfer characteristics thus provided will be parabolic rather than the ideal logarithmic configuration. However, the improved temperature stability and slope uniformity produces an overall improvement in the system.

The above-mentioned objects, and various additional features and advantages of the invention will become apparent from the following detailed description of illustrative embodiments thereof taken in conjunction with the accompanying drawings, in which.

Figures 1, 5:
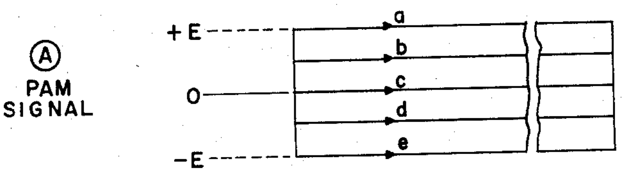
FIG. 5 is a series of related waveforms useful in understanding the operation of the expanding and compressing steps, circuits, and arrangements of the invention.
Figures 2, 3, 5:
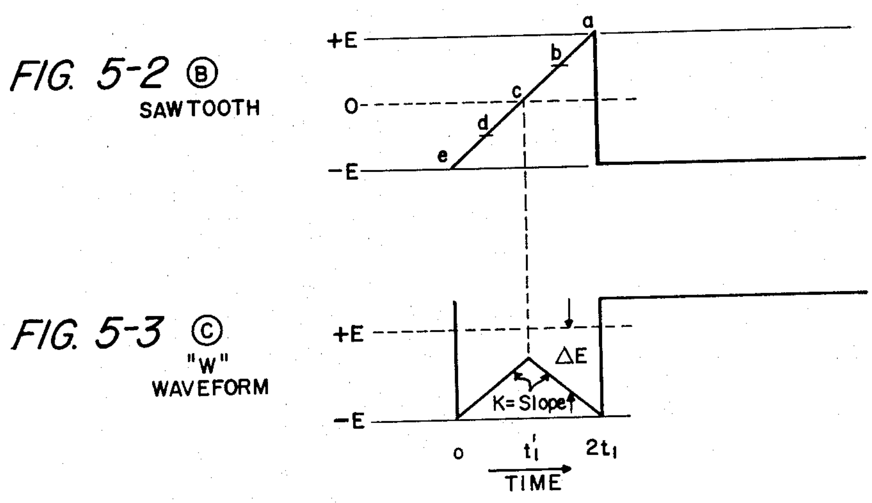
Figures 4, 5:
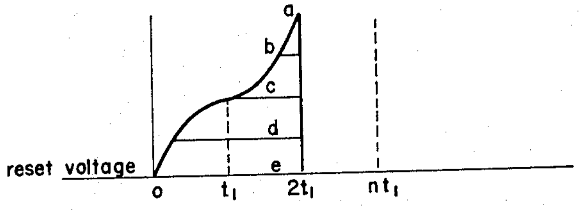
Figure 5:
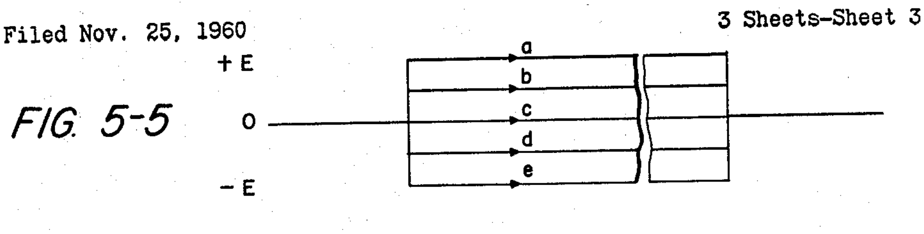
Figures 5, 6, 7:
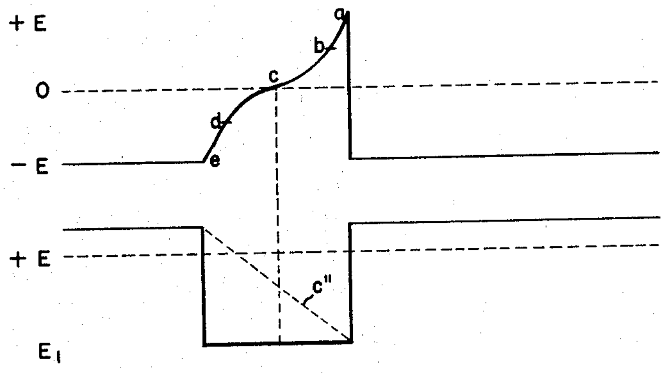
FIG. 6 is a simplified block diagram of a PCM system incorporating the compressor-expander arrangements of the invention.
Figures 5, 6, 7, 8:
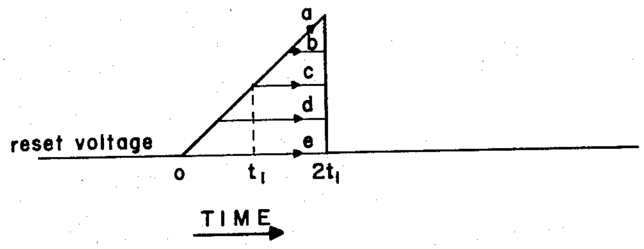
Figure 6:
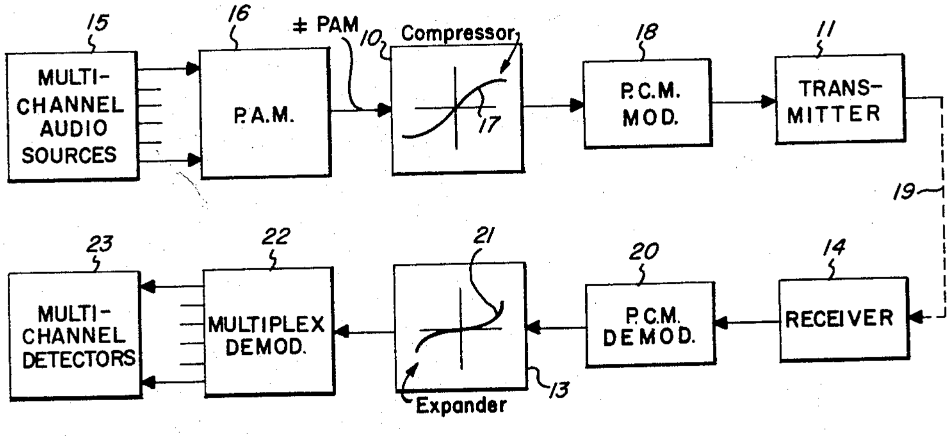

Referring first to FIGURE 6, a typical PCM multichannel system is illustrated in block form which employs a compandor arrangement consisting of the signal pre-distorting compressor unit 10 located in the PCM transmitter 11, and the expander unit 13 which restores the signal linearity located in the PCM receiver 14. The general operation of the system provides that the transmitter 11 may have a plurality of separate audio sources 15 fed to the audio modulator 16 wherein the changes of audio amplitude for each channel are translated into changes of pulse amplitudes. These pulses are then interleaved for application to the compressor 10. For example there may be 24 separate sources of audio signals applied to the modulator 16 to produce a 24 channel ± PAM signal which is applied to compressor 10 for compression of signal variations as required in the particular transmission medium in accordance with the characteristic curve 17. The compressed PAM pulse train is then applied to the PCM modulator 18 for translation to a predetermined PCM pulse train and application therefrom to the transmitter 11 for application over the transmission link 19. Transmission link 19 may be a radio frequency space link, a video frequency cable link, or the like.

Energy is received from the transmission medium 19 and applied therefrom to the PCM demodulator 20 by the receiver 14. Demodulator 20 operates to translate the PCM pulse train into a ± PAM pulse train. This PAM signal is then applied to the expander 13 to remove the distortion introduced at compressor 10 by a circuit having a complementary characteristic with respect to the compression characteristic 17, as substantially shown by the characteristic curve 21. Provided that curves 17 and 21 are maintained uniform and stable as reversed complements of one another, the overall linearity of the system will have been maintained and the channel pulses of the PAM signal will then be separated into their respective channels by multiplex demodulator 22, and each will be applied to an appropriate audio detector within the multi-channel detecting means 23 for faithful reproduction of the audio information fed into the system by the sources 15.

It will be apparent to those skilled in the art, however, that any variation in the characteristic curves 17 or 21 will introduce distortion within the system. When such curves are produced by diode characteristics, as in the prior art, variations in the slope of one or both curves may occur due to the non-uniformity of the diode elements utilized to an extent that is undesirable for faithful reproduction of the audio signals transmitted over the system.

To overcome undesirable variations in the characteristic curves 17 and 21, the present invention derives such characteristic curves from sweep circuits and integrators, and thus substitutes a modified sawtooth slope or ramp function for that of the usual diode characteristic. The basic operations of this type of expander 13 and compressor 10 are shown in the block diagrams of FIGS. 1 and 2, respectively. Bearing in mind the fact that the ± PAM signals fed into expander 13 are distorted such that the pulses produced by the nominal audio levels at the sources 15 have been altered for passage through transmission link 19, and thus pulses representing highest sound volumes have been reduced in amplitude while pulses representing lowest sound volumes have been increased in amplitude by operation of compressor 10 in accordance with the characteristic curve 17 thereof, the necessary expansion within element 13 for restoring the signal levels will first be described.

Figure 1:
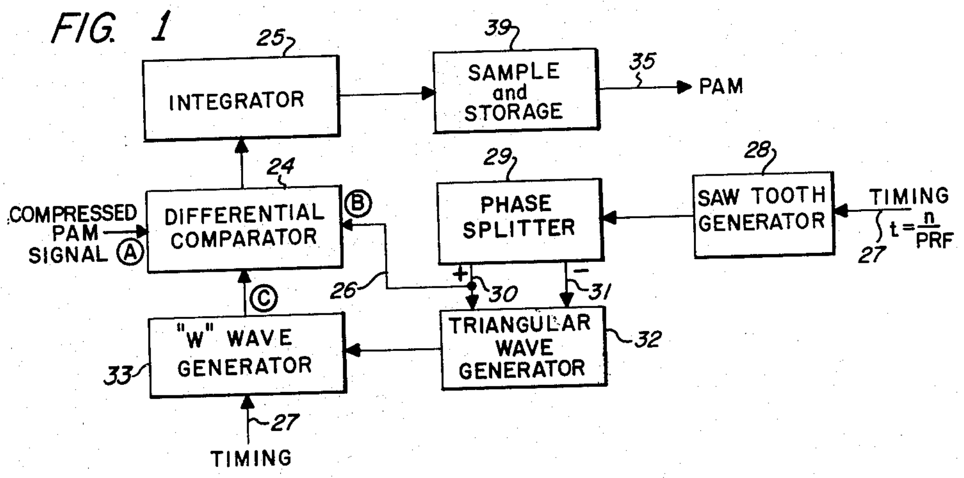
FIG. 1 is a block diagram of the expander arrangement according to the invention.
Figures 2, 3:
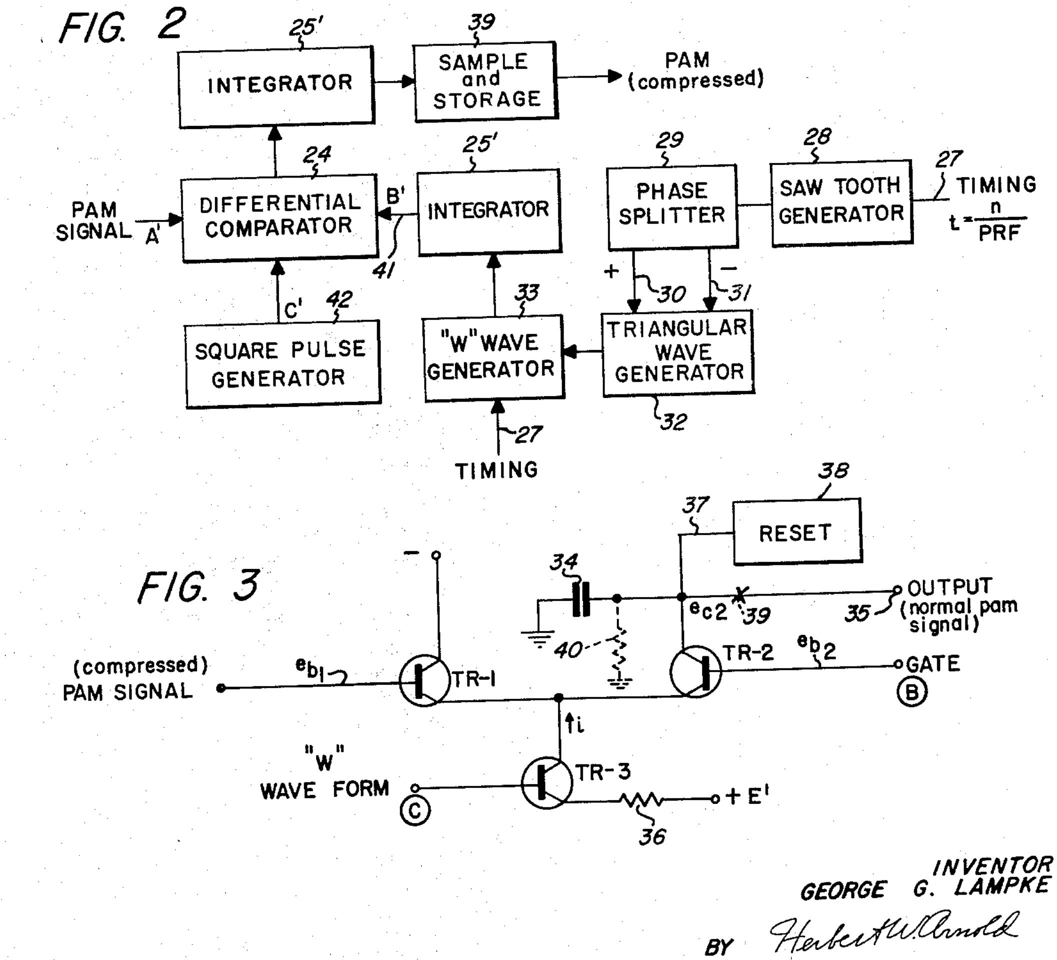
FIG. 2 is a block diagram of the complementary compressor arrangement.
FIG. 3 is a basic circuit diagram of a differential comparator which may be utilized within the corresponding expander block element of FIG. 1.

As shown in FIG. 1, the actual expansion is performed by the differential comparator 24 and the integrator 25. The expander comparator 24, shown in detail in FIG. 3, has three inputs; two inputs A and B which are compared, and a third input C which acts as a current drive. The waveforms of such three inputs are illustrated in FIG. 5 as 5—1, 5—2, and 5—3, respectively. Input A to the expander of FIG. 1 is the compressed ± PAM signal developed in the demodulator 20 of FIG. 6, and will have amplitude variations in the range between the limits of +E and −E, as shown by the arbitrary amplitude levels *a*, *b*, *c*, *d*, and *e* of FIG. 5—1. Input B, applied to comparator 24 over the lead 26, is a positive-going linear sawtooth wave as shown in FIG. 5—2 which varies between the limits of −E and +E during the pulse timing period commencing at 0 and continuing through $2t_1$ as indicated in such figure. The positive sawtooth wave input B is cyclically derived by the sawtooth generator 28 at a rate and timing period which is determined by the inverse of the pulse repetition frequency of the PCM system. Lead 27 indicates the appropriate synchronizing timing input to generator 33 which may be taken from either receiver 14 or demodulator 20.

The phase splitter 29, coupled to the ouput of sawtooth generator 28, provides the aforesaid wave B over the lead 26. Phase splitter 29 also provides a negative-going sawtooth wave, and both of such waves are fed over the leads 30 and 31, respectively, as inputs to the triangular wave generator shown as block element 32. Generator 32 basically combines the positive-going and negative-going sawtooth waves within a gate, which gate bears the proper time relationship to the system pulse repetition frequency. Both linear sawtooth inputs to the generator 32 will be matched, since they are derived by passing through phase splitter 29. Any suitable type of linear sawtooth waveform generator may be utilized within block element 28, for example a Miller integrator, a Bootstrap integrator, a current-driven capacitor, or a simple R–C network with appropriate selection of the linear portions of the derived transient voltage.

Obviously, the triangular waveform developed in generator 32 may be of either positive or negative polarity depending upon the D.C. level established and the type of gate employed therein. Any known transistor or diode gate may be utilized within generator 32. The output from triangular generator 32 is fed as an input to the "W" wave generator 33 which produces the third input wave C for comparator 24. The W-shaped wave produced within generator 33 may also be generated in a number of ways. The time relationship of input wave C, as shown in FIG. 5—3, is established by means of the timing input over lead 27. One suitable method of generation of this W-shaped wave consists of the concurrent application of the triangular waveform developed in generator 32 and a square wave pulse of proper polarity and timing as inputs to an "OR" gate of a simple diode or transistor type. The output of such gate may assume the most positive or negative input level.

Integrator 25 is actually incorporated within the comparator 24 as shown in detail in a preferred circuit embodiment at FIG. 3. Such integration function is produced by the capacitor 34 which is connected in parallel with the output terminal 35 from which the expanded PAM signal is fed to the PCM multiplex demodulator element 22 of FIG. 6. The driving current for comparator 24 is supplied as shown by the waveform C connected to the base element of transistor circuit member TR–3 of FIG. 3. This current flows principally from the base of TR–3 through a resistor 36 which is connected between the emitter element of TR–3 and a voltage source of the level +E′, the value of which voltage is indicated in FIG. 5—3. This current flowing through the resistor impresses a voltage across such resistor which in turn provides a driving current which may flow, via the emitter-collector path of transistor TR–3, through one or the other of transistor circuit members TR–1 and TR–2. Such driving current *i*, which is indicated in FIG. 3, flows through the transistor circuit member TR–2 only when the base element of TR–2 is more negative in value than the base of the transistor circuit member TR–1. As indicated in FIG. 3, the base of TR–1 is connected to the source of compressed PAM signals which vary within the range indicated as waveform A (FIG. 5—1), while the remaining input to the comparator 24, the positive-going sawtooth wave B is connected to the base element of TR–2. The emitter elements of TR–1 and TR–2 are interconnected to each other and to the collector element of TR–3. Therefore, the current *i*, supplied by the W-shaped wave C, flows through TR–2 when its base element is more negative than that of TR–1, otherwise such current flows through TR–1. Thus, referring to FIG. 5, during the time period when $t<0$; $e_{b1}=0$ and $e_{b2}=-E$; but since waveform C is more positive than +E′ no current can flow through TR–2. Therefore, $e_{c2}$ is clamped to the reset voltage level which is applied over lead 37 from the indicated source 38 during all time periods other than that indicated in FIG. 5. However, such reset voltage is removed during the time $0 \leq t \leq 2t_1$ so that $e_{c2}$ may vary in accordance with the current flowing.

Assume that $e_{b1}$, a compressed PAM signal applied to the base element of TR–1 of +E volts, is applied at time $t=0$. Thus over the entire time period from 0 to $2t_1$ shown in FIG. 5, i.e., $0 \leq t \leq 2t_1$, the waveform B which is applied as the voltage $e_{b2}$ to the base element of TR–2 will always be more negative than waveform A. During this time, therefore, TR–2 will remain "ON" and TR–1 "OFF." The current flowing through TR–2 during such period may be written as the expression:

$$i = \frac{E^1 - C}{R_{36}} = \frac{\Delta E}{R_{36}} \quad \text{Equation (1)}$$

Since the reset pulse is removed during the time period from 0 to $2t_1$, $e_{c2}$ will change as follows:

$$e_{c2} = \frac{1}{C_{34}} \int_0^{2t_1} i dt \quad \text{Equation (2)}$$

$$= \frac{1}{C_{34}R_{36}} \int_0^{2t_1} \Delta E dt = \frac{1}{C_{34}R_{36}} \int_0^{2t_1} (E^1 - C) dt \quad \text{Equation (3)}$$

Figure 4:
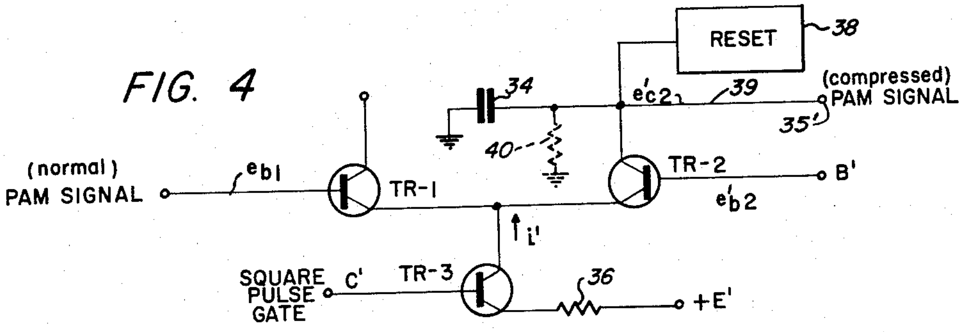
FIG. 4 is a basic circuit diagram of a differential comparator which may be used within the corresponding block element of the compressor of FIG. 2.

It can be proven that the output at terminal 35 will be asymmetrical about the time $t_1$ if waveform C is symmetrical, and it will have the form shown in FIG. 5—4.

Such output voltage is derived from the connection to the collector element of TR–2, and is designated above as the quantity $e_{c2}$, as indicated in FIG. 3. The collector element of TR–1 is returned to the negative voltage source, also as indicated in FIG. 3. It will now be recognized that the waveform or characteristic at the collector of TR–2, $e_{c2}$, has the desired expansion characteristic shown in the curve 21 of expander 13 at FIG. 6. Voltage $e_{c2}$ will follow a square law curve center at $t_1$. This curvature may be altered by adjusting ΔE or K, where K is the slope of the W-shaped wave C, and ΔE is the difference between such wave and the voltage +E′, as shown in FIG. 5—3. The slope at $t_1$ of the characteristic expansion curve, $e_{c2}$ shown in FIG. 5—4, may be made Zero if ΔE becomes 0 at the time $t = t_1$, thus obtaining infinite expansion. As the PAM signal amplitude varies between the levels of +E and −E, the output will vary as shown by the typical developed paths *a, b, c, d* and *e* of FIG. 5—4. The output voltage $e_{c2}$ may be stretched by sampling and storing the signal amplitudes at the time $t = 2t_1$ until a later time such as that indicated by the dashed line at $t = nt_1$ in FIG. 5—4, by means of the optional sampling and storage element 39 shown in FIG. 1, which block element would physically be inserted before the output terminal 35 as designated by the dotted line arrow shown at the location X in FIG. 3.

The pre-distortion provided by the compressor 10 of FIG. 6 in accordance with the curve 17 is effected by means of the compressor circuit shown in block form in FIG. 2. The block elements shown in FIG. 2 are similar in function, characteristic, and construction to those of the similar elements previously described in connection with FIG. 1. The basic preferred electrical embodiment of such comparator is shown in FIG. 4, with the corresponding input waveforms illustrated in FIGS. 5—5, 5—6 and 5—7.

It will be noted that FIG. 4 is identical electrically with FIG. 3, and the compressor comparator circuit 24 is thus the same as that of the expander described above, except that different signals are applied to the several transistor bases and a different output is derived. The compression is performed by the differential comparator 24 and the integrator 25. The compressor comparator 24, shown in detail in FIG. 4, has three inputs; two inputs A′ and B′ which are compared, and a third input C′ which acts as a current drive. The waveforms of such three inputs are illustrated in FIG. 5 as 5—5, 5—6, and 5—7, respectively. Input A′ to the compressor of FIG. 2 is the normal ± PAM signal developed in the modulator 16 of FIG. 6, and will have amplitude variations in the range between the limits of +E and −E, as shown by the arbitrary amplitude levels *a, b, c, d,* and *e* of FIG. 5—5. Input B′, applied to comparator 24 over the lead 41, in the case of the compressor, is an integrated form of the W-shaped wave produced within generator 33 and then fed through an interventing integrator 25′ as shown in FIG. 2. Such integrated W-shaped wave is shown in FIG. 5—6, and it will be noted that the overall configuration thereof agrees with that of the wave shown in FIG. 5—4. The basic W-shaped wave produced within generator 33 may be derived in exactly the same manner as that described above with respect to the expander of FIG. 1, by means of the block elements 28, 29 and 32, and the related signal leads 27, 30 and 31. Integrator 25′ which follows generator 33 may consist of a simple capacitor circuit element as in the case of the capacitor 34 of the integrators 25, or may optionally comprise a more sophisticated combination of circuit elements, as is known in the art.

The third input wave C′ for the compressor comparator 24 consists of a square pulse gate as shown in FIG. 5—7. Wave C′ is developed in generator 42 and consists of a square wave pulse of proper polarity, timing, and magnitude in relation to the system pulse repetition frequency. The amplitude of such gate or square wave pulse affects the overall gain of the compressed signal, and may be chosen at a predetermined level with respect to the most positive or negative input level. As indicated in FIG. 5—7, in the preferred embodiment the amplitude of the square pulse gate wave C′ of the compressor 10 is chosen to be of the same order as that of the W-shaped wave C which provides the current drive for the comparator circuit of the expander 13.

As in the expander circuit embodiment of FIG. 3, the preferred circuit embodiment of the compressor which is shown in detail in FIG. 4, actually incorporates the integrator 25 within the comparator 24. Again such integration function is produced by a capacitor 34 which is connected in parallel with an output terminal 35′ from which the compressed PAM signal is fed to the PCM modulator element 18 of FIG. 6. Also, as in the expander, the current generated by transistor circuit member TR–3 during the time period from Zero to $2t_1$ shown in FIG. 5, i.e., $0 \leq t \leq 2t_1$, flows through the transistor circuit member TR–2 only during such times when the base element thereof is more negative in value than the base of the transistor circuit member TR–1. If the amplitude of the normal PAM signal wave A′ which is connected as an input to the base element of TR–1 has the value of +E volts (FIG. 5—5), then, as in the expander, an indicated current *i′* will flow through the compressor transistor TR–2 during the entire time period, for the reason that the waveform B′ which is applied as the voltage $e'_{b2}$ to the base element of TR–2 will always be more negative than waveform A′. During this time therefore, the output voltage $e'_{c2}$ at terminal 35′ will be the integral of such driving current, and may be written, in a manner analogous to that in Equation 3 above, as the expression:

$$e'_{c2} = \frac{1}{C_{34}R_{36}} \int_0^{2t_1} (E' - C') dt \quad \text{Equation (4)}$$

Such output voltage will have the form shown in FIG. 5—8. It will be recognized that such wave, being based upon the waveform B′, is related to the desired compression characteristic shown in the curve 17 of compressor 10 at FIG. 6.

Voltage $e'_{c2}$ will be asymmetrical about the time $t_1$, and as the PAM signal amplitude is reduced the output from terminal 35′ will vary as shown by the typical developed paths *a, b, c, d,* and *e* of FIG. 5—8. Due to the shape of waveform B′, low amplitude pulse signals will be expanded and high signals will be compressed. As previously noted, the amplitude of wave C′ affects only the overall gain of the compressed signal. The compression characteristics are determined by waveform B′, and as in the case of the expander, the compressed signal may be stretched by sampling and storing the signal amplitudes beyond the time $t = 2t_1$ by means of an optional sampling and storage element 39 which would physically be inserted before the output terminal 35′ in the manner previously described above.

In order that the expansion characteristic of the receiver of the PCM system may be properly matched and complementary to the compression characteristic, waveforms B' and B, shown in FIG. 5, must be the same; since the PAM signals are the same amplitude. However, in both the expander and compressor waves B and B' may vary over an equal but wider range than the +E to −E range of the PAM signal amplitudes shown in waves A and A', and in such a mode of operation only selected portions of their characteristics would be used.

In order to obtain perfectly balanced PAM and provide an overall linearity in the PCM system, it is essential that the center value of the PAM signal pulse corresponds to the time $t=t_1$ as shown in FIG. 5. As shown in this figure, such time point is half-way up the waveforms B and B', and the W-shaped waves are perfectly symmetrical about such point.

Various modifications in both the method of operation and the actual circuit construction utilized in accordance with the invention will be apparent to those skilled in the art, bearing in mind the fact that any sources of distortion within the overall system are to be avoided. Due to the fact that the system of the present invention relies upon compression and expansion characteristics as derived by slope functions, rather than the diode characteristic curves of the prior art, it will be noted that such slope functions must be accurately maintained as to both their linearity and time of generation. Otherwise, distortion may develop due to inaccuracies of making a decision within the differential comparator of either the expander or compressor. Such inaccuracies of decision would be readily obviated, if the distortion should prove to be too great for certain applications, by the use of a more accurate regenerative type of comparator, for example one utilizing the Schmidt trigger circuit. Also, if the signal levels permit, the use of signals having a much greater range than that of the indecision range of the comparator will also improve the overall distortion factor of the system.

In the described preferred embodiment in both the expander of FIG. 1 and the compressor of FIG. 2 the associated integration step has been provided by integrators 25 which follow the differential comparator 24. Integration may also be performed before the comparator stage. In such instance, the current drive for the differential comparator 24 of the expander of FIG. 1 may be an integrated W-shaped waveform similar to that shown in FIG. 5—6 rather than the W-shaped waveform C of FIG. 5—3. Also, the current drive for the differential comparator 24 of the compressor of FIG. 2 may be a linear sawtooth such as the dashed-line wave C'' indicated in FIG. 5—7, which is the integrated form of the square pulse gate wave C' of FIG. 5—7. In both instances, the capacitor 34 of the comparator circuit is replaced by a resistor 40, as indicated in dotted outline in FIGS. 3 and 4. This will produce an output voltage $e_{c2}$ which is proportional in amplitude to the current drive. Obviously, this alternative method involving integration of the C or C' waveform before the comparator does not provide the storage capabilities of the preferred embodiment first described. Thus the use of a separate sampling and storage element such as that of block 39 to precede the output terminal 35 or 35' would be preferred; for when reference is made to FIGS. 5—4 and 5—8 it will be noted that the final voltage is maintained at output terminal due to the presence of the capacitor 34, until the time that the reset voltage is applied. Although such reset voltage, as previously mentioned, is applied at the time $t=2t_1$, such application may be delayed to allow for more storage during large positive PAM signals. In order to maintain low distortion levels or factors over wide temperature ranges, drift during the storage time due either to capacitor (storage) leakage currents or transistor drift should be corrected by the incorporation of the usual compensation techniques.

It will be noted that the electrical circuit embodiments of FIG. 3 and of FIG. 4 are identical. Substitution of a triangular waveform input to the base of TR–3 in place of the W-shaped wave C of the FIG. 3 expander will reverse its function and operation to that of a compressor; although different compression characteristics will be obtainer. If compression is effected in this manner, a related and matched expander may be provided by comparing an integrated triangular waveform on the base of TR–2 to the PAM signal input on the base of TR–1 rather than the one described. The integration step may also alternatively be performed on the current drive input to TR–3 before the differential comparion in this form of the invention also.

Although the system signals described in the general operation of the PCM system of FIG. 6 have been designated as ± PAM modulations, the described block element and electrical circuits of the invention may be utilized for the compression and expansion of unidirectional or rectified PAM signals also. One suitable method of operation for unidirectional PAM signals would be that wherein the differential comparators were operated in an unbalanced manner by the D.C. shifting of the waveforms B and B' so that the most positive peaks, in the case of negative PAM signals, would coincide with the most positive PAM signals. Essentially, only the time period from zero to $t_1$, i.e., $0 \leq t \leq t_1$, would thus be utilized; corresponding to the first half of the asymmetrical compression and expansion characteristics of the curves 17 and 21. Obviously, generation of only half of the waveforms shown in FIG. 5 as A, B, C; A', B', and C' would produce the same result.

Thus, while the principles of the invention have been described above in connection with certain specific arrangements of block elements, and corresponding preferred electrical circuit embodiments, it should be clearly understood that each description has been made only by way of example and not as a limitation to the scope of such invention, which is as set forth in the appended claims.

What is claimed is:

1. In a pulse code modulation signal communication system comprising a transmitter having a compression device for compressing input modulated signals according to a given compression characteristic curve and a receiver for receiving said signal transmission, said receiver including an expansion device for expanding received signals according to an expansion characteristic curve substantially the complement of said compression characteristic curve, means including said compression device to generate said characteristic curves in said transmitter and receiver from nonlinear slope function waveforms derived from a sawtooth wave generated independent of said input modulated signals in timed relation to the cyclic pulse repetition rate of said system.

2. In a pulse amplitude modulation signal communication system comprising a transmitter having a compression device for compressing input modulated signals according to a given compression characteristic curve and a receiver for receiving said signal transmission, said receiver including an expansion device for expanding received signals according to an expansion characteristic curve substantially the complement of said compression characteristic curve, means including said compression device to generate said characteristic curves in said transmitter and receiver from nonlinear slope function waveforms for compressing and expanding said modulated signals derived from a sawtooth wave generated independent of said input modulated signals in timed relation to the cyclic pulse repetition rate of said system.

3. A communication system according to claim 2 wherein said slope function waveforms are derived by sweep circuit means and integrator means, and said characteristic curves are resulting nonlinear parabolic functions.

4. A communication system according to claim 3 wherein said parabolic function characteristic curves expressed by:

$$F=K\int\Delta E dt$$

are derived from slope function and fixed voltage means.

5. In a pulse code modulation signal communication system comprising a transmitter having a compression device for compressing input modulated signals according to a given compression characteristic curve and a receiver for receiving said signal transmission, said receiver including an expansion device for expanding received signals according to an expansion characteristic curve substantially the complement of said compression characteristic curve, the method of generating said characteristic curves in said transmitter and receiver which comprises the steps of generating, independent of said input modulated signals, a sawtooth wave in timed relation to the cyclic pulse repetition rate of said system, and deriving a modified slope function waveform from said sawtooth wave.

6. A communication system according to claim 5 wherein the step of deriving a modified slope function waveform includes a square pulse generator means for providing a parabolic function characteristic curve.

7. In a pulse code modulation signal communication system comprising a transmitter having a compression device for compressing modulated signals according to a given compression characteristic curve and a receiver for receiving said signal transmission, said receiver including an expansion device for expanding received signals according to an expansion characteristic curve substantially the complement of said compression characteristic curve, the method of compressing said modulated signals which includes the steps of generating a sawtooth wave in said transmitter in inverse timed relation to the cyclic pulse repetition frequency, deriving a modified slope function waveform from said sawtooth wave, and differentially comparing such slope function waveform with said modulated signals.

8. A communication system according to claim 7 wherein the step of deriving a modified slope function waveform includes integrator means for providing a parabolic function characteristic curve.

9. In a pulse code modulation signal communication system comprising a transmitter having a compression device for compressing modulated signals according to a given compression characteristic curve and a receiver for receiving said signal transmission, said receiver including an expansion device for expanding received signals according to an expansion characteristic curve substantially the complement of said compression characteristic curve, the method of expanding said received signals which includes the steps of generating a sawtooth wave in said receiver in inverse timed relation to the cyclic pulse repetition frequency, deriving a modified slope function waveform from said sawtooth wave, and differentially comparing such slope function waveform with said received signals.

10. A communication system according to claim 9 wherein the step of deriving a modified slope function waveform includes comparator means for providing a parabolic function characteristic curve.

References Cited by the Examiner

UNITED STATES PATENTS

| | | | |
|---|---|---|---|
| 2,220,689 | 11/40 | Shore | 179—15.55 |
| 2,795,650 | 6/57 | Levine | 179—15.6 |
| 2,803,702 | 8/57 | Ville et al. | 325—38.1 |
| 2,816,267 | 12/57 | De Jager et al. | 325—38.1 |
| 2,874,222 | 2/59 | De Jager | 179—15.5 |
| 2,897,275 | 7/59 | Bowers | 325—38.1 |

OTHER REFERENCES

"A Sampling Comparator," Electronic Engineering, December 1958, pages 685–389.

DAVID G. REDINBAUGH, *Primary Examiner.*

L. MILLER ANDRUS, *Examiner.*